(12) United States Patent
Yang

(10) Patent No.: US 11,476,646 B2
(45) Date of Patent: Oct. 18, 2022

(54) RETRACTING AND EXTENDING APPARATUS FOR CIRCUIT BREAKER WITH INTERLOCK MODULE

(71) Applicant: LSIS CO., LTD., Anyang-si (KR)

(72) Inventor: Hong-Ik Yang, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 0 days.

(21) Appl. No.: 16/574,886

(22) Filed: Sep. 18, 2019

(65) Prior Publication Data

US 2020/0212658 A1 Jul. 2, 2020

(30) Foreign Application Priority Data

Jan. 2, 2019 (KR) .................. 10-2019-0000387

(51) Int. Cl.
*H02B 11/133* (2006.01)
*H01H 3/04* (2006.01)
(Continued)

(52) U.S. Cl.
CPC ............. *H02B 11/133* (2013.01); *H01H 3/04* (2013.01); *H01H 9/20* (2013.01);
(Continued)

(58) Field of Classification Search
CPC ..... H02B 11/133; H02B 11/12; H02B 11/127; H02B 11/167; H02B 11/173; H02B 1/20;
(Continued)

(56) References Cited

U.S. PATENT DOCUMENTS 3,474,201 A * 10/1969 Bould .................. H02B 11/133
200/50.09
5,036,427 A * 7/1991 Krom .................... H02B 11/127
361/609
(Continued)

FOREIGN PATENT DOCUMENTS

CN 202183570 U 4/2012
CN 102761070 A 10/2012
(Continued)

OTHER PUBLICATIONS

Korean Office Action for related Korean Application No. 10-2019-0000387; dated Apr. 10, 2020; (4 pages).
(Continued)

*Primary Examiner* — Lheiren Mae A Caroc
(74) *Attorney, Agent, or Firm* — K&L Gates LLP

(57) ABSTRACT

An apparatus for retracting and extending a main body of a circuit breaker includes: a conveying module for retracting or extending the main body into or from a distribution box of the circuit breaker; a lever module including a lever selectively switching between a first state and a second state, where the lever module allows movement of the conveying module when the lever is in the first state, and disallows movement of the conveying module when the lever is in the second state; and an interlock module configured to allow the lever to switch to the first state only when a predetermined external input is applied to the interlock module.

5 Claims, 10 Drawing Sheets

(51) Int. Cl.
*H01H 9/20* (2006.01)
*H01H 71/02* (2006.01)
*H02B 1/20* (2006.01)
*H02B 1/04* (2006.01)
*H02B 1/30* (2006.01)

(52) U.S. Cl.
CPC ........... *H01H 71/0264* (2013.01); *H02B 1/04* (2013.01); *H02B 1/20* (2013.01); *H02B 1/30* (2013.01)

(58) Field of Classification Search
CPC ... H02B 1/04; H02B 1/30; H01H 9/20; H01H 71/0264; H01H 3/04; H01H 9/28; H01H 9/22; H01H 9/223; H01H 9/226; H01H 9/285
USPC ......... 200/50.01, 50.21, 50.23, 50.24–50.26, 200/50.22, 50.27, 50.17, 50.02, 50.09, 200/50.19; 361/606–609, 615–617, 601, 361/605, 724–727; 218/155
See application file for complete search history.

(56) References Cited

U.S. PATENT DOCUMENTS

| | | | | |
|---|---|---|---|---|
| 6,028,272 | A * | 2/2000 | Akers | H02B 11/133 200/50.21 |
| 6,066,814 | A * | 5/2000 | Smith | H01H 9/22 200/50.22 |
| 6,884,949 | B2 * | 4/2005 | Yoon | H02B 11/133 200/50.26 |
| 8,395,064 | B2 * | 3/2013 | Kim | H02B 11/133 200/50.21 |
| 8,471,159 | B2 * | 6/2013 | Han | H02B 11/133 200/50.25 |

FOREIGN PATENT DOCUMENTS

| | | |
|---|---|---|
| CN | 103066518 A | 4/2013 |
| CN | 203769454 U | 8/2014 |
| CN | 206864992 U | 1/2018 |
| CN | 107768181 A | 3/2018 |
| DE | 19530682 A1 | 2/1997 |
| JP | 1990-059528 | 5/1990 |
| KR | 20040092599 A | 11/2004 |
| KR | 20140088451 A | 7/2014 |
| KR | 20150089730 A | 8/2015 |

OTHER PUBLICATIONS

Chinese Office Action for related Chinese Application No. 201910905669.8; dated Mar. 23, 2021; (8 pages).

Chinese Office Action for related Chinese Application No. 201910905669.8; dated Oct. 11, 2021; (8 pages).

Chinese Notice of Allowance for related Chinese Application No. 201910905669.8; action dated Aug. 16, 2022; (7 pages).

* cited by examiner

[FIG. 1]
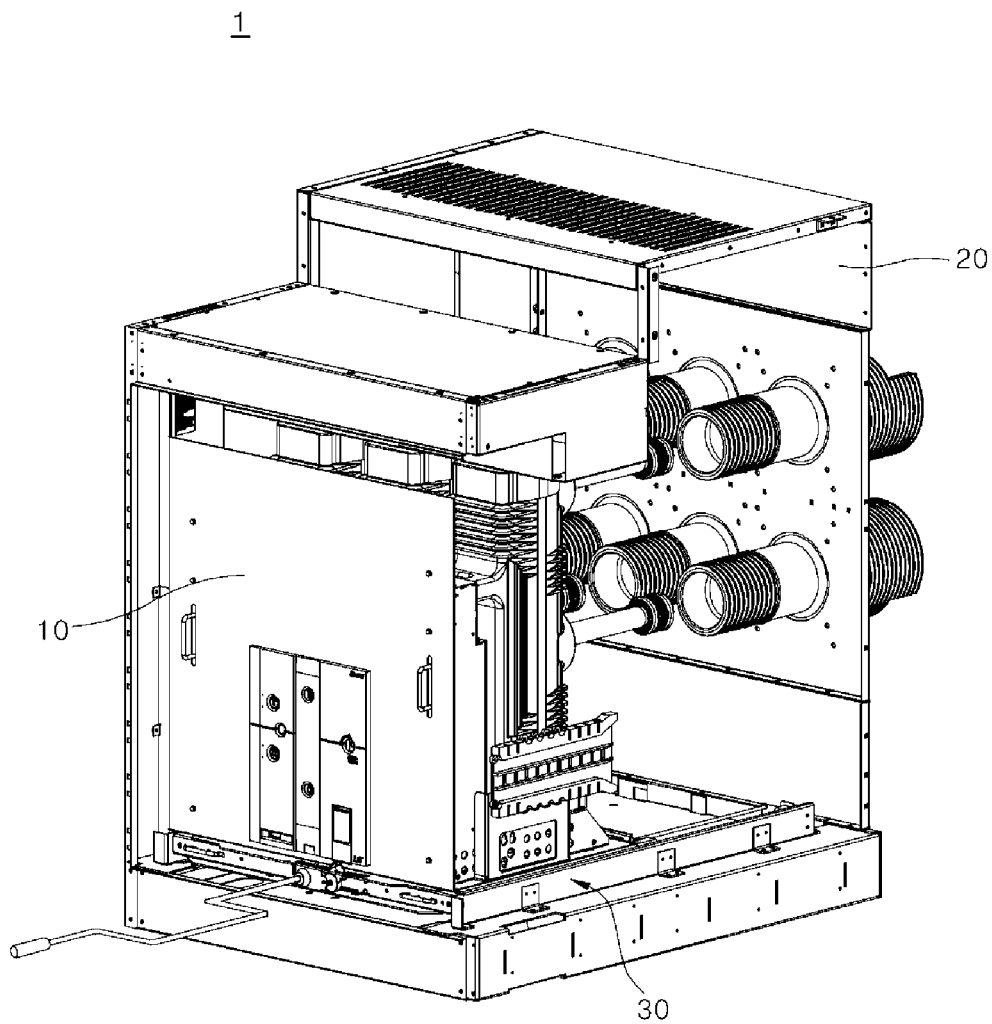

[FIG. 2]
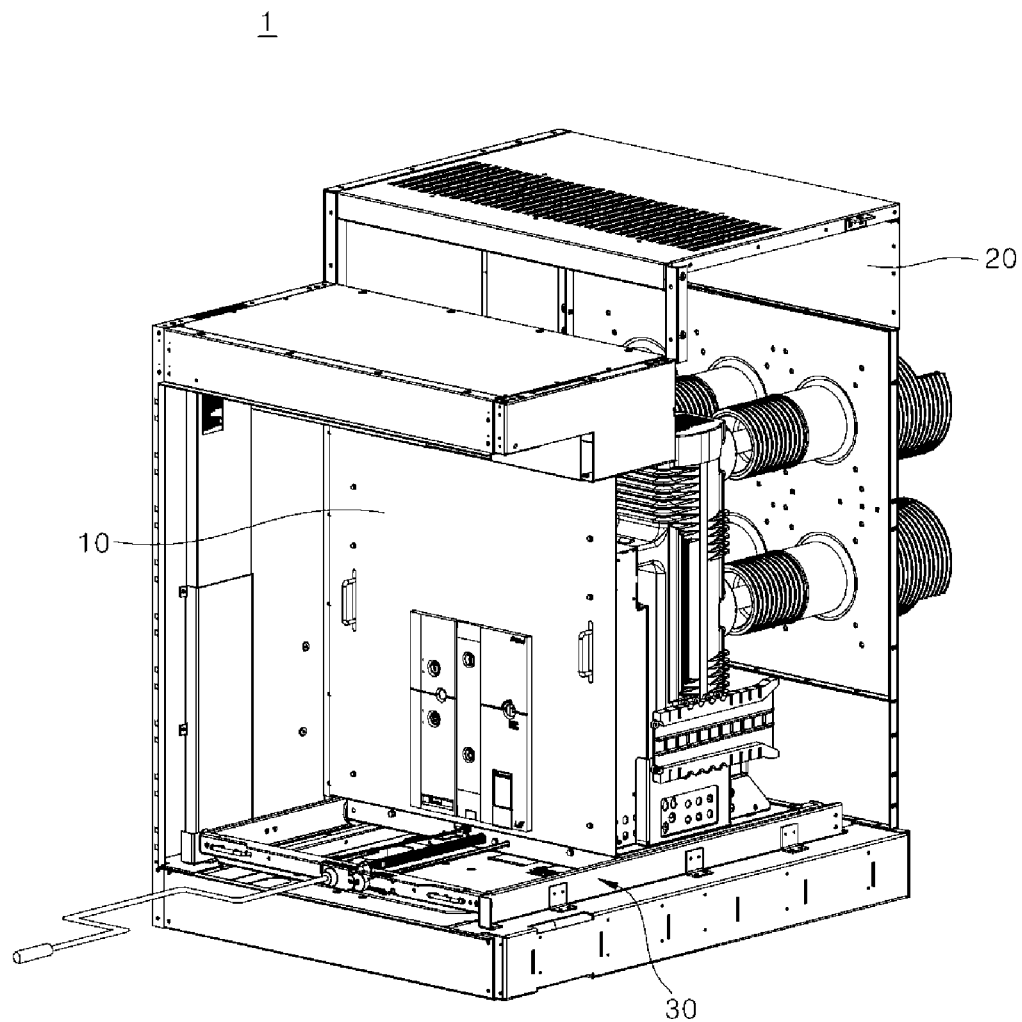

[FIG. 3]
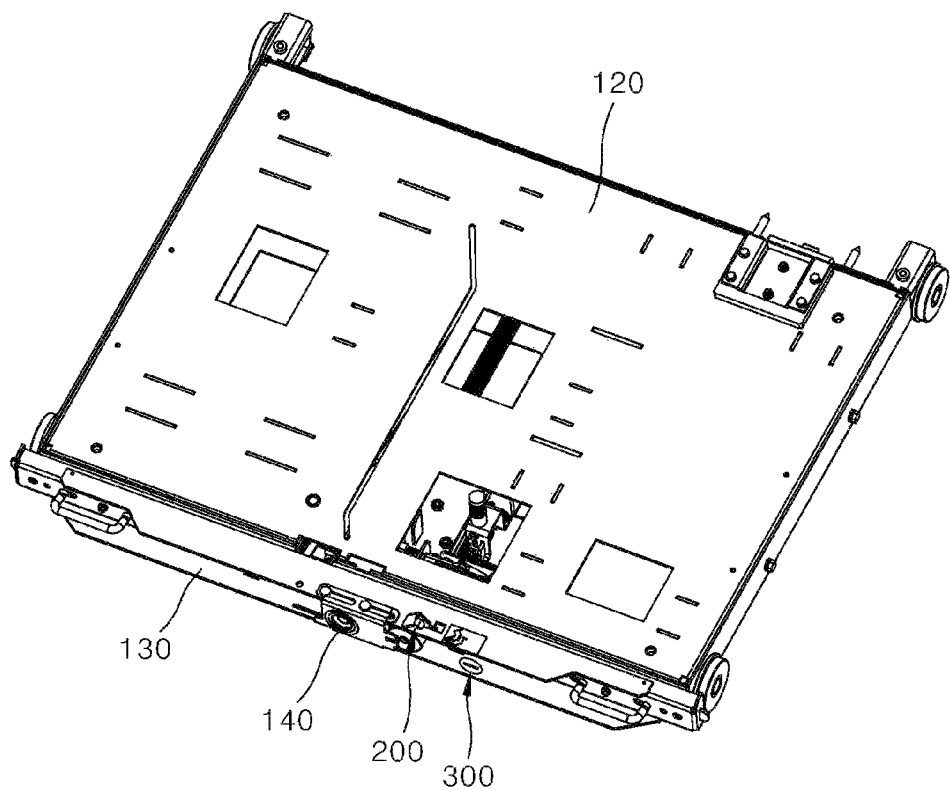

[FIG. 4]
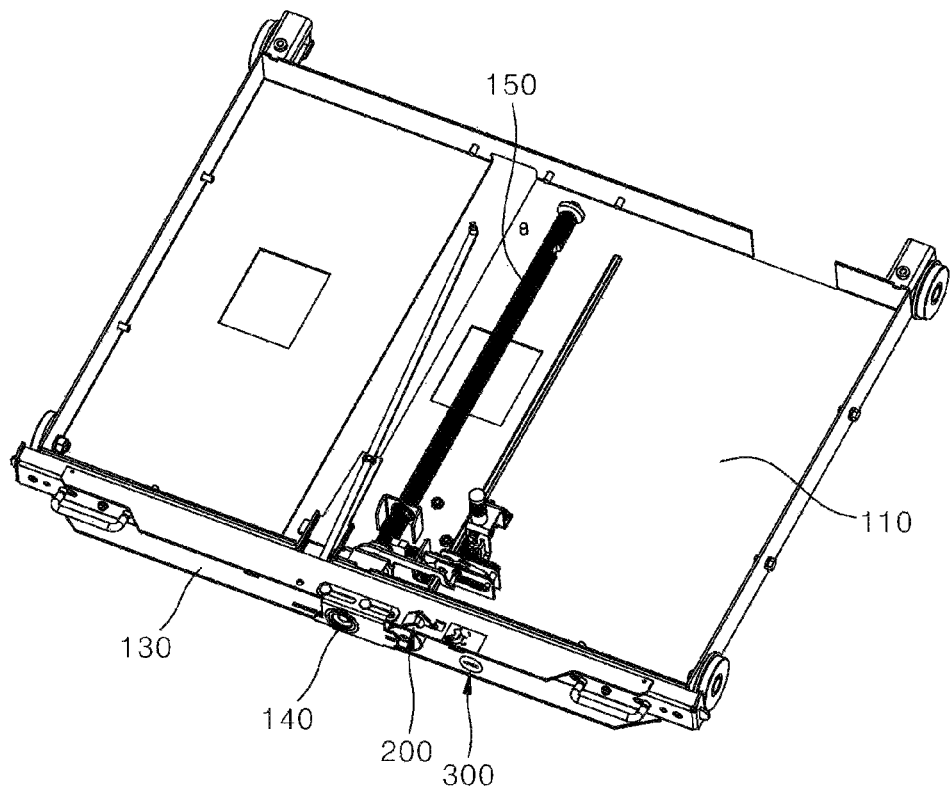

[FIG. 5]
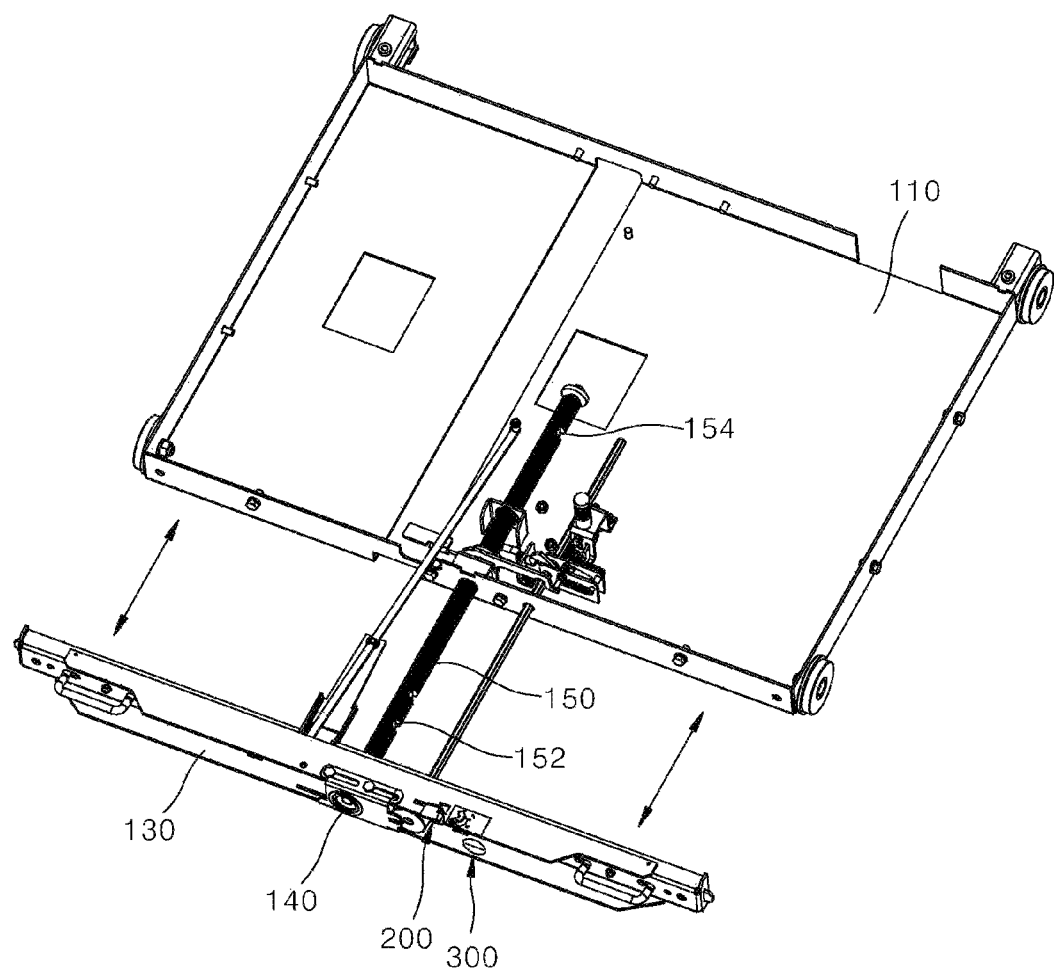

[FIG. 6]
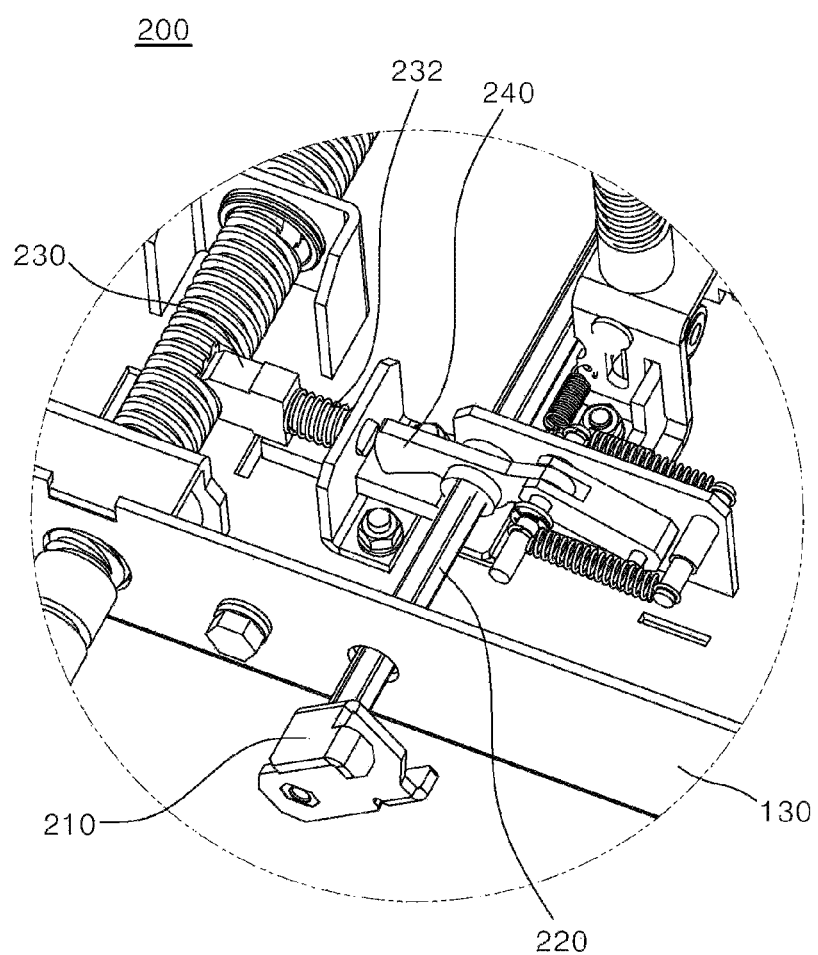

[FIG. 7]
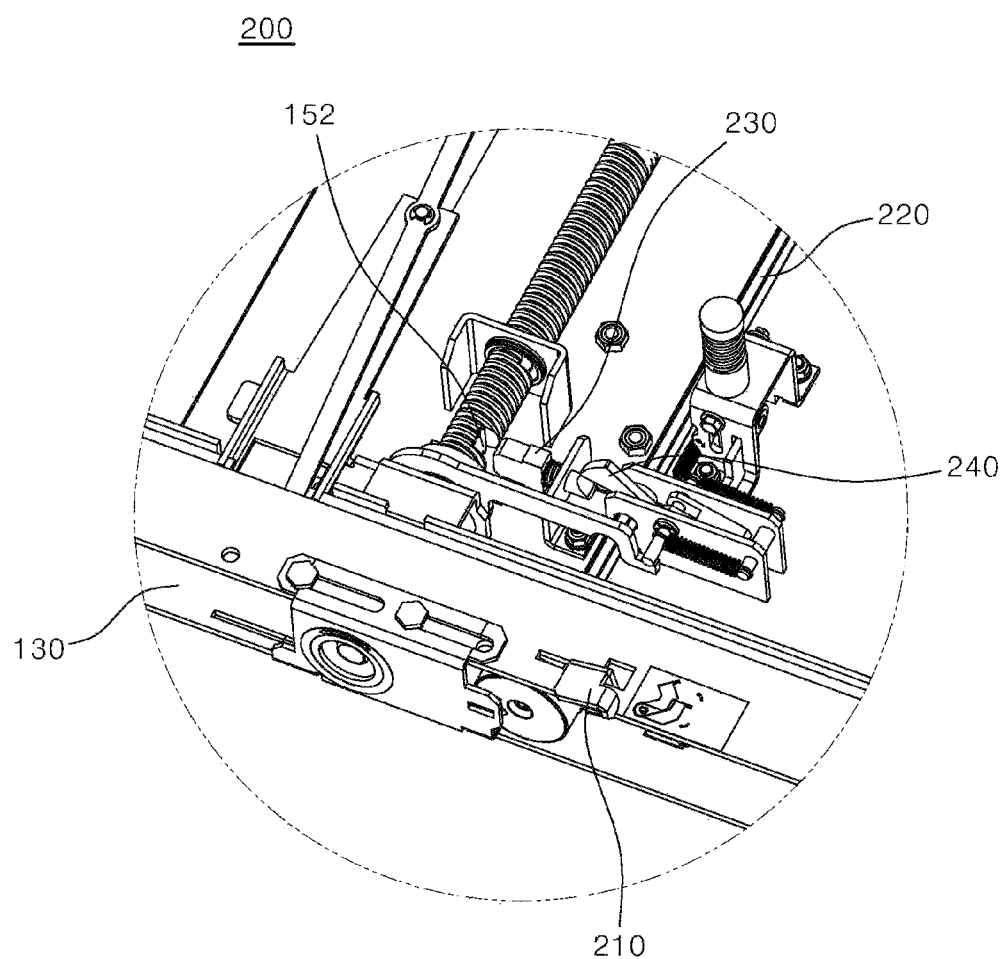

【FIG. 8】
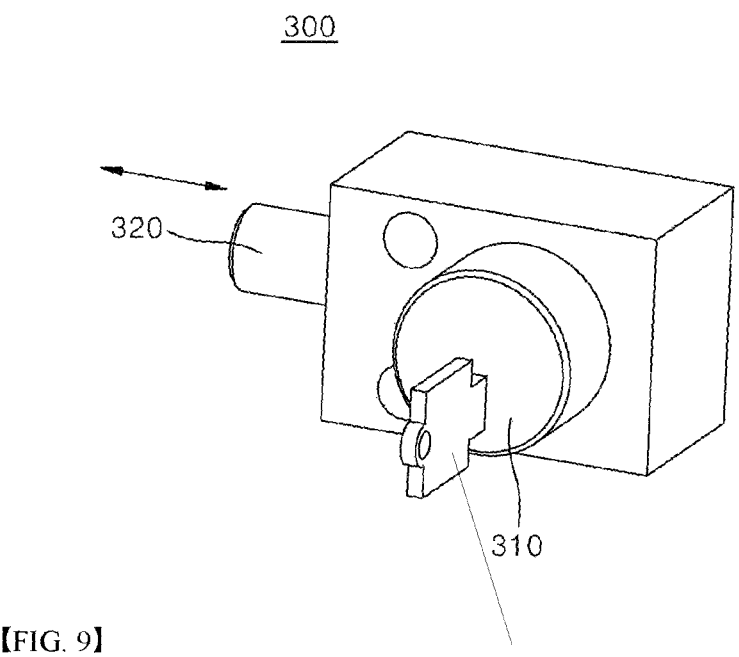
【FIG. 9】
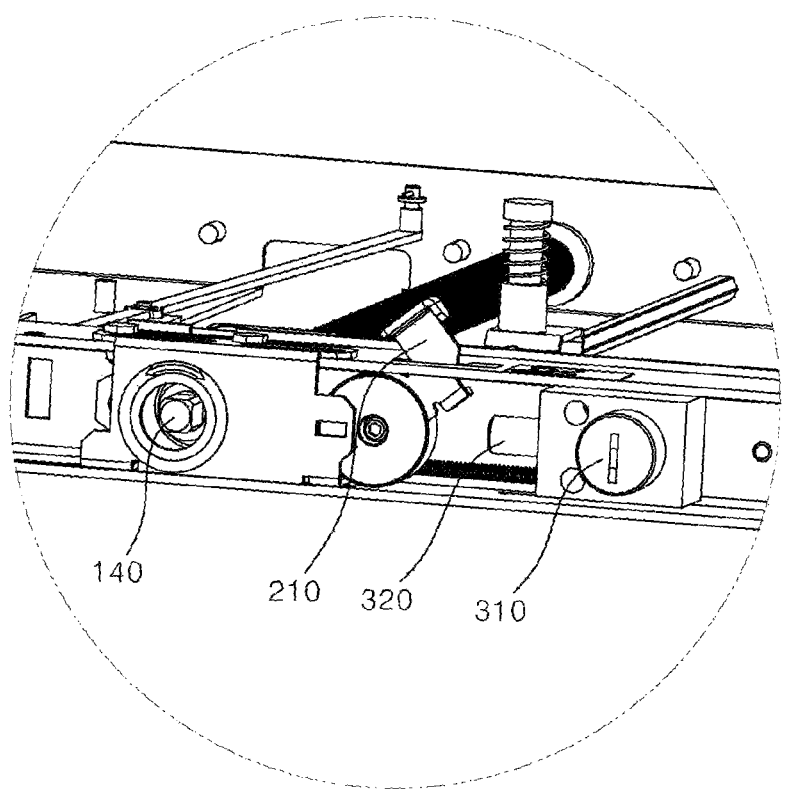

[FIG. 10]
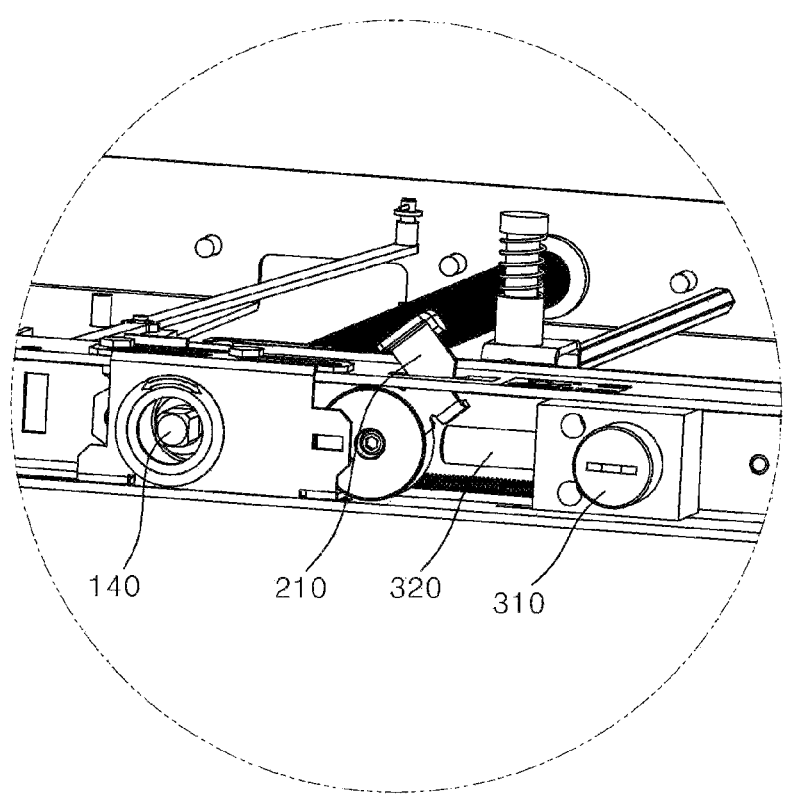

[FIG. 11]
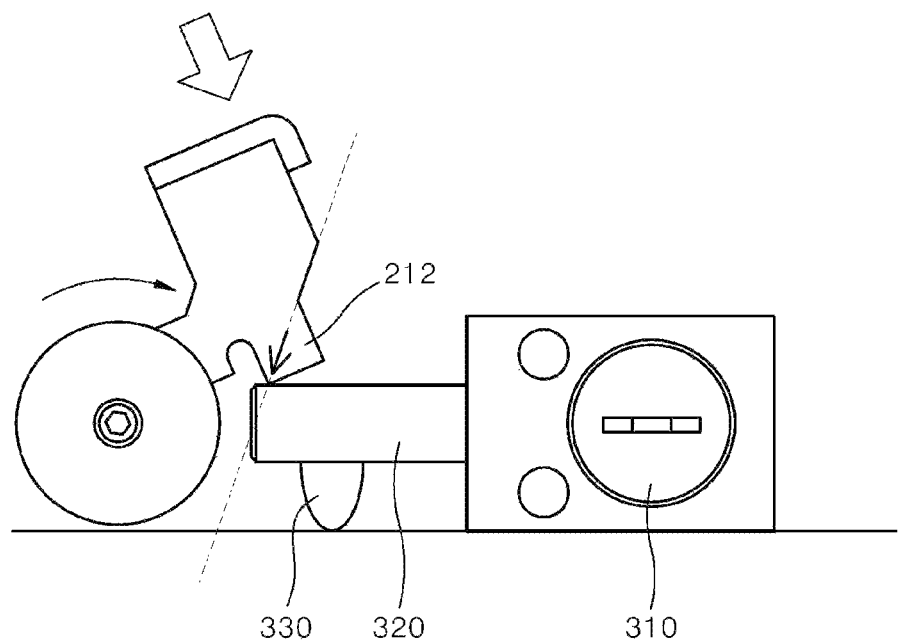

RETRACTING AND EXTENDING APPARATUS FOR CIRCUIT BREAKER WITH INTERLOCK MODULE

CROSS-REFERENCE TO RELATED APPLICATIONS

Pursuant to 35 U.S.C. § 119(a), this application claims the benefit of earlier filing date and right of priority to Korean Patent Application No. 10-2019-0000387 filed on Jan. 2, 2019, in the Korean Intellectual Property Office, the disclosure of which is hereby incorporated by reference in its entirety.

BACKGROUND

1. Technical Field

The present disclosure relates to a retracting and extending apparatus for a circuit breaker. Specifically, the present disclosure relates to a retracting and extending apparatus which prevents a main body of a circuit breaker from retracting or extending while the main body has been inserted into a distribution box of the circuit breaker.

2. Description of the Related Art

In general, a circuit breaker is installed in a power distribution board for operation or control of a substation and a motor.

The circuit breaker is usually housed inside a distribution box.

The circuit breaker includes a main busbar terminal and a load terminal. The distribution box includes terminal holes electrically connected to the busbar terminal and load terminal of the circuit breaker. The terminal holes of the distribution box is then electrically connected to main circuitry.

The circuit breaker may be classified into a fixed type circuit breaker only having a main body fixed to a distribution box panel, and a movable type circuit breaker in which a main body of the circuit breaker is retracted or extended in or from the distribution box connected to the main circuitry in order to facilitate maintenance and repair of the circuit breaker.

In the movable type circuit breaker, a plurality of terminals connected to the main circuitry are arranged in the distribution box. When the main body of the circuit breaker has been inserted into the distribution box, each finger provided on the main body contacts each terminal.

When the main body of the circuit breaker is retracted into the distribution box, the main busbar and load terminals are electrically connected to the main circuitry such that the circuit breaker is brought into a connection state where voltage and current are supplied to a target object.

When the circuit breaker is in the connection state, the main body of the circuit breaker must not be extended from the distribution box. Further, the operation of the circuit breaker should stop while the main body is being retracted or extended to or from the distribution box.

However, conventionally, an operator manually extends the main body even while the circuit breaker is in the operation or connection state. Therefore, without the operator's special attention, the main body could be extended from the distribution box while the circuit breaker is operating.

Therefore, there is a need for a solution for solving the above problem.

SUMMARY

The present disclosure is designed to solve the above-mentioned problem of the prior art. Thus, the present disclosure is to provide a retracting and extending apparatus for a circuit breaker that prevents a main body of the circuit breaker from being movable when the circuit breaker is in an operation or connecting state.

Purposes of the present disclosure are not limited to the above-mentioned purpose. Other purposes and advantages of the present disclosure as not mentioned above may be understood from following descriptions and more clearly understood from embodiments of the present disclosure. Further, it will be readily appreciated that the purposes and advantages of the present disclosure may be realized by features and combinations thereof as disclosed in the claims.

In one aspect of the present disclosure, there is proposed an apparatus for retracting and extending a main body of a circuit breaker, the apparatus comprising: a conveying module for retracting or extending the main body into or from a distribution box of the circuit breaker; a lever module including a lever selectively switching to between a first state and a second state, wherein the lever module allows movement of the conveying module when the lever is in the first state, and disallows movement of the conveying module when the lever is in the second state; and an interlock module configured to allow the lever to switch to the first state only when a predetermined external input is applied to the interlock module.

In one implementation, the conveying module includes: a handle receiving portion receiving a predetermined handle; a conveying screw configured to rotate together with rotation of the handle inserted into the handle receiving portion; and a conveying base receiving the main body thereon, wherein the conveying base retracts or extends into or from the distribution box as the conveying screw rotates.

In one implementation, the lever module includes: an insert configured to rotate by an external force applied to the lever; and a slidable block configured to switch to between a movable state and a fixed state based on rotation of the insert.

In one implementation, the lever module further includes a latch unit coupled to the insert and rotating together with the rotation of the insert, wherein when the lever is in the second state, the latch unit urges the slidable block such that the slidable block is in contact with the conveying screw, wherein when the lever is in the first state, the latch unit is spaced from the slidable block such that the slidable block moves to be spaced apart from the conveying screw.

In one implementation, when the external force is applied to the lever, the lever rotates in one direction to switch to the first state, wherein when the external force is removed from the lever, the lever returns to an original position thereof to switch to the second state.

In one implementation, the interlock module includes an interlock pin configured to contact the lever to prevent the rotation of the lever.

In one implementation, the interlock module further includes a key receiving portion receiving a predetermined external input using a key, wherein when the predetermined external input is applied to the key receiving portion, the interlock pin moves in one direction to allow the rotation of the lever.

In one implementation, the interlock pin includes a supporter protruding from the interlock pin while the interlock pin being disposed between the supporter and the lever, wherein the supporter is in contact with an adjacent wall of the circuit breaker.

Effects of the present disclosure are as follows but are not limited thereto.

The present disclosure has the effect of preventing a safety accident by preventing the main body from extending from the distribution box while the circuit breaker is in operation.

In addition, the main body cannot be inserted into the distribution box in the process of retracting or extending the main body of the circuit breaker, thereby increasing safety.

In addition to the effects as described above, specific effects of the present disclosure are described together with specific details for carrying out the invention.

BRIEF DESCRIPTION OF THE DRAWINGS

FIG. 1 is a perspective view showing a retracting and extending apparatus for a circuit breaker according to an embodiment of the present disclosure.

FIG. 2 is a perspective view illustrating a state in which a main body has been retracted in a distribution box by a retracting and extending apparatus for a circuit breaker according to an embodiment of the present disclosure.

FIG. 3 is a perspective view of a conveying module in a retracting and extending apparatus for a circuit breaker according to an embodiment of the present disclosure.

FIG. 4 is a perspective view showing a configuration of a conveying module in a retracting and extending apparatus for a circuit breaker according to an embodiment of the present disclosure.

FIG. 5 is a perspective view illustrating a state in which a conveying module is being retracted to a distribution box in a retracting and extending apparatus for a circuit breaker according to an embodiment of the present disclosure.

FIG. 6 is a perspective view of a lever module in a retracting and extending apparatus for a circuit breaker according to an embodiment of the present disclosure.

FIG. 7 is a perspective view showing a state in which a lever switches to a first state in a retracting and extending apparatus for a circuit breaker according to an embodiment of the present disclosure.

FIG. 8 is a perspective view of an interlock module in a retracting and extending apparatus for a circuit breaker according to an embodiment of the present disclosure.

FIG. 9 and FIG. 10 illustrate a working relationship between a lever and an interlock pin in a retracting and extending apparatus for a circuit breaker according to one embodiment of the present disclosure.

FIG. 11 illustrates a state in which a supporter is provided on an interlock pin in a retracting and extending apparatus for a circuit breaker according to an embodiment of the present disclosure.

DETAILED DESCRIPTIONS

For simplicity and clarity of illustration, elements in the figures are not necessarily drawn to scale. The same reference numbers in different figures denote the same or similar elements, and as such perform similar functionality. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers. It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, retracting and extending apparatuses for a circuit breaker according to some embodiments of the present disclosure will be described.

FIG. 1 is a perspective view showing a retracting and extending apparatus for a circuit breaker according to an embodiment of the present disclosure. FIG. 2 is a perspective view illustrating a state in which a main body has been retracted in a distribution box by a retracting and extending apparatus for a circuit breaker according to an embodiment of the present disclosure.

As shown in FIG. 1 and FIG. 2, a circuit breaker 1 according to an embodiment of the present disclosure includes a distribution box 20 provided with a terminal connected to main circuitry. The circuit breaker 1 further includes a main body 10 that is retracted or extended into or from the distribution box 20.

The main body 10 includes a main busbar terminal and a load terminal that are electrically connected to terminals provided in the distribution box 20 when the main body is retracted into the distribution box 20.

As used herein, a state in which the main body 10 has been retracted into the distribution box 20 and operates therein may be referred to as "being inserted". In addition, the main body 10 may be subjected to a test while the main body 10 is extended from the distribution box 20.

FIG. 3 is a perspective view of a conveying module in a retracting and extending apparatus for a circuit breaker according to an embodiment of the present disclosure. FIG. 4 is a perspective view showing a configuration of a conveying module in a retracting and extending apparatus for a circuit breaker according to an embodiment of the present disclosure.

As shown in FIG. 3 and FIG. 4, the retracting and extending apparatus for a circuit breaker according to an embodiment of the present disclosure includes a conveying module 30, a lever module 200, and an interlock module 300.

The conveying module 30 retracts or extends the main body 10 relative to the distribution box 20 of the circuit breaker 1. The lever module 200 includes a lever 210 switching between a first state and a second state. When the lever 210 is in the first state, this permits working of the conveying module 30. When the lever 210 is in the second state, this interrupts working of the conveying module 30.

Further, the lever 210 can switch to the first state only when a predetermined external input is applied to the interlock module 300.

Thus, the retracting or extending operation of the main body 10 to or from the distribution box 20 is only enabled when the lever 210 is switched to the first state. In order to switch the lever 210 to the first state, a predetermined external pressure must be input to the interlock module 300.

Hereinafter, each component as described above will be described in more detail.

The conveying module 30 includes a conveying base 110, a conveying plate 120, a girder 130, a handle receiving portion 140 and a conveying screw 150.

The conveying base 110 is configured to reciprocate in at least one direction.

The conveying plate 120 is mounted on a top of the conveying base 110 and receives the main body 10 thereon. Specifically, the conveying plate 120 is coupled to the top of the conveying base 110 and the main body 10 is seated on the conveying plate 120 and fixed thereto.

The girder 130 is fixed to the distribution box of the circuit breaker 1. A handle receiving portion 140 for manipulating the operation of the conveying base 110, the lever 210 of the lever module 200 to be described later, and a key receiving portion 310 of the interlock module 300 are mounted on the girder 130.

Further, the conveying base 110 depends on the girder 130 and moves away from or closer to the girder 130.

The handle receiving portion 140 may receive a handle having a predetermined diameter such that the user may rotate the handle while the handle is received in the handle receiving portion 140. The user may insert the handle into the handle receiving portion 140 and rotate the handle to rotate the conveying screw 150 together.

The conveying screw 150 has a predetermined length in a conveying direction of the conveying base 110 and one end of the conveying screw 150 is coupled to the girder 130. The conveying base 110 is coupled to the other end of the conveying screw 150 and is conveyed in one or the other direction as the conveying screw 150 rotates.

Specifically, when the conveying screw 150 rotates in one direction, the conveying base 110 is conveyed away from the girder 130. When the conveying screw 150 rotates in the other direction, the conveying base 110 is conveyed closer to the girder 130.

FIG. 5 is a perspective view illustrating a state in which a conveying module is being retracted to a distribution box in a retracting and extending apparatus for a circuit breaker according to an embodiment of the present disclosure.

As shown in FIG. 5, the conveying base 110 is conveyed in one direction or the other direction with respect to the girder 130, such that the main body 10 is conveyed together with the conveying base 110.

Therefore, the main body 10 is retracted or extended into or from the distribution box 20 as the conveying base 110 moves with respect to the girder 130.

FIG. 6 is a perspective view of a lever module in a retracting and extending apparatus for a circuit breaker according to an embodiment of the present disclosure. FIG. 7 is a perspective view showing a state in which a lever switches to a first state in a retracting and extending apparatus for a circuit breaker according to an embodiment of the present disclosure.

As shown in FIG. 6 and FIG. 7, the lever module 200 includes the lever 210, an insert 220, a slidable block 230, and a latch unit 240.

The lever 210 is mounted on the girder 130. when the user opens a door (not shown) of the circuit breaker 1, the girder 130 is exposed to the outside. The user may actuate the handle receiving portion 140 of the girder 130, the lever 210 of the lever module 200, and the key receiving portion 310 of the interlock module 300 while the door of the circuit breaker 1 is opened.

The lever 210 rotates in one direction by the user applying an external force thereto, and returns to its original position when the external force is removed.

The lever 210 is coupled to the insert 220.

The insert 220 extends through the girder 130 and onto the top of the conveying base 110.

When an external force is applied to the lever 210 which in turn rotates in one direction, the insert 220 depending on the lever 210 rotates in one direction.

The insert 220 has a predetermined length along an imaginary axis of rotation around which the insert 220 rotates. The insert 220 is associated with the slidable block 230 via the latch unit 240 on the top of the conveying base 110. Specifically, the latch unit 240 is oriented to press the slidable block 230 in one direction. The slidable block 230 includes a block spring 232. The block spring 232 applies an elastic force toward the conveying screw 150 to the slidable block 230. Therefore, a front end of the slidable block 230 is in contact with an outer periphery of the conveying screw 150 but the slidable block 230 does not restrain the rotation of the conveying screw 150. This is because when the conveying screw 150 rotates, and at the same time, the outer circumference of the conveying screw 150 interferes with the slidable block 230, the slidable block 230 is supported by the elastic force of the block spring 232 and moves backwards, and ultimately does not physically affect the rotation of the conveying screw 150.

However, the latch unit 240 is in contact with a rear end of the slidable block 230. Thus, the latch unit 240 in contact with the rear end of the slidable block 230 supports the slidable block 230 to prevent the slidable block 230 from moving backwards. Thus, when the conveying screw 150 rotates and is interfered by the slidable block 230, the conveying screw 150 cannot rotate due to the interference by the slidable block 230.

The latch unit 240 contacts the rear end of the slidable block 230 to prevent the slidable block 230 from moving backwards such that the slidable block 230 prevents the conveying screw 150 from rotating. This operation may be achieved in absence of the external force applied to the lever 210.

The absence of the external force applied to the lever 210 may be defined as the second state. That is, the lever 210 is in the second state in which no external force is applied to the lever 210. When the lever 210 is in the second state, the slidable block 230 works to prevent the conveying screw 150 from rotating.

In this connection, a portion of the front end of the slidable block 230 may be accommodated in a first groove 152 or a second groove 154 formed in the conveying screw 150.

Each of the first groove 152 and the second groove 154 may be formed at a predetermined position. Positions of the first groove 152 and the second groove 154 respectively correspond to a position where the main body 10 has been inserted to the distribution box 20 and operates, and a position where the main body 10 has extended and is subjected to the test. Further, more grooves may be formed according to embodiments to which the present disclosure is applied.

In addition, a state in which an external force is applied to the lever 210 such that the lever 210 and the insert 220 rotate in one direction may be defined as the first state.

When the lever 210 is in the first state, the latch unit 240 is released from the rear end of the slidable block 230 due to the rotation of the insert 220. The slidable block 230 retracts or move backwards as the latch unit 240 is removed from the rear end of the slidable block 230.

Therefore, when the lever 210 is in the first state, the slidable block 230 does not prevent the conveying screw 150 from rotating.

The rotation of the conveying screw 150 may allow the conveying base 110 to retract or extend the main body 10 into or from the distribution box 20. When the lever 210 is in the second state, the movement of the main body 10 is blocked. When the lever 210 is in the first state, the main body 10 may be movable.

Further, the latch unit 240 may receive an elastic force from an elastic member while the latch unit 240 is in the first state as the external force is applied to the lever 210. In this connection, the elastic force is directed to force the latch unit 240 to return to the second state. Accordingly, when the external force applied to the lever 210 is removed, the latch unit 240 and the lever 210 return to the first state using the elastic force from the elastic member.

FIG. 8 is a perspective view of an interlock module in a retracting and extending apparatus for a circuit breaker according to an embodiment of the present disclosure. FIG. 9 and FIG. 10 illustrate a working relationship between a lever and an interlock pin in a retracting and extending apparatus for a circuit breaker according to one embodiment of the present disclosure. FIG. 11 illustrates a state in which a supporter is provided on an interlock pin in a retracting and extending apparatus for a circuit breaker according to an embodiment of the present disclosure.

As shown in FIG. 8 to FIG. 10, the interlock module 300 may be mounted on the girder 130. The interlock module 300 may be disposed adjacent to the lever 210.

The interlock module 300 includes the key receiving portion 310, and an interlock pin 320. The key receiving portion 310 may receive a predetermined external input. The predetermined external input may be applied using a key 311 inserted into the key receiving portion in one example.

The interlock pin 320 extends in one direction from the key receiving portion 310. In one embodiment of the present disclosure, the interlock pin 320 extends under the lever 210. Even when an external force is applied to the lever 210, the lever 210 is brought into contact with the interlock pin 320 and thus may further rotate.

Therefore, the interlock pin 320 prevents the rotation of the lever 210. Thus, the lever 210 cannot further rotate even when an external force is applied to the lever 210. As a result, the user will not be able to move the main body 10.

The interlock pin 320 may retract into the key receiving portion 310 when a predetermined external input is applied to the key receiving portion 310. Thus, the interlock pin 320 may be positioned out of a radius of rotation of the lever 210.

Therefore, when a predetermined external input is input to the key receiving portion 310, the lever 210 may rotate by the user applying an external force to the lever 210.

As shown in FIG. 11, the interlock pin 320 may further include a supporter 330 in the retracting and extending apparatus for the circuit breaker according to an embodiment of the present disclosure.

The supporter 330 extends downwardly from the interlock pin 320. The supporter 330 may be opposite to the lever 210 around the interlock pin 320. Further, the supporter 330 contacts an adjacent wall of the circuit breaker 1. The supporter 330 may be required due to a following reason. The lever 210 presses the interlock pin 320 when an external force is applied to the lever 210 without a predetermined external input applied to the key receiving portion 310. Then, the pressing operation is repeated, such that the interlock pin 320 may be deformed or damaged. Thus, the supporter 330 may be configured to prevent the interlock pin 320 from being deformed or damaged.

In addition, the lever 210 may further include a contact 212 in contact with the interlock pin 320. The contact 212 is formed such that when an external force is applied to the lever 210, a direction at which a force from the lever 210 presses the interlock pin 320 is a direction away from the key receiving portion 310. The configuration of the contact 212 may be due to a following reason. When the interlock pin 320 is retracted or extended to or from the key receiving portion 310, the repetitive external force applied from the lever 210 to press the interlock pin 320 may be directed to the key receiving portion 310. Thus, the physical damage or deformation may occur more easily. For this reason, the contact 212 is formed such that when an external force is applied to the lever 210, a direction at which a force from the lever 210 presses the interlock pin 320 is a direction away from the key receiving portion 310.

Although the present disclosure has been described with reference to the drawings illustrating the present disclosure, the present disclosure is not limited to the embodiments and drawings disclosed in the present specification. It will be apparent that various modifications may be made by those skilled in the art within the scope of the present disclosure. In addition, it should be appreciated that effects to be achieved from configurations of the present disclosure as not expressly mentioned may be acknowledged.

What is claimed is:

1. An apparatus for retracting and extending a main body of a circuit breaker, the apparatus comprising:
   a conveying module for retracting or extending the main body into or from a distribution box of the circuit breaker;
   a lever module including a lever selectively switching between a first state and a second state, wherein the lever module allows movement of the conveying module when the lever is in the first state, and disallows movement of the conveying module when the lever is in the second state; and
   an interlock module configured to allow the lever to switch to the first state only when a predetermined external input is applied to the interlock module, wherein the interlock module comprises:
      a key receiving portion into which a key is inserted to apply the predetermined external input by rotation of the key; and
      an interlock pin,
   wherein when the predetermined external input is input, the interlock pin permits rotation of the lever by moving in a direction of the key receiving portion and being accommodated in the key receiving portion so that the lever is in the first state,
   wherein when the predetermined external input is not input, the interlock pin prevents the rotation of the lever by moving in an opposite direction of the key receiving portion,
   wherein the interlock pin includes a supporter protruding from the interlock pin, wherein the interlock pin is disposed between the supporter and the lever, wherein the supporter is in contact with an adjacent wall of the circuit breaker.

2. The apparatus of claim 1, wherein the conveying module includes:
   a handle receiving portion receiving a predetermined handle;
   a conveying screw configured to rotate together with rotation of the handle inserted into the handle receiving portion; and
   a conveying base receiving the main body thereon, wherein the conveying base retracts or extends into or from the distribution box as the conveying screw rotates.

3. The apparatus of claim 2, wherein the lever module includes:
   an insert configured to rotate by an external force applied to the lever; and
   a slidable block configured to switch between a movable state and a fixed state based on rotation of the insert.

4. The apparatus of claim 3, wherein the lever module further includes a latch unit coupled to the insert and rotating together with the rotation of the insert, wherein when the lever is in the second state, the latch unit urges the slidable block such that the slidable block is in contact with the conveying screw,
   wherein when the lever is in the first state, the latch unit is spaced from the slidable block such that the slidable block moves to be spaced apart from the conveying screw.

5. The apparatus of claim 3, wherein when the external force is applied to the lever, the lever rotates in one direction to switch to the first state,
   wherein when an external force is removed from the lever, the lever returns to an original position thereof to switch to the second state.

* * * * *